Sept. 28, 1971 J. R. BISSON 3,608,252
COMBINATION HATCHWAY-HOTHOUSE
Filed Nov. 5, 1969 2 Sheets-Sheet 1

INVENTOR
JOSEPH R. BISSON

BY

FISHMAN & VAN KIRK
ATTORNEYS

Sept. 28, 1971   J. R. BISSON   3,608,252
COMBINATION HATCHWAY-HOTHOUSE
Filed Nov. 5, 1969   2 Sheets-Sheet 2
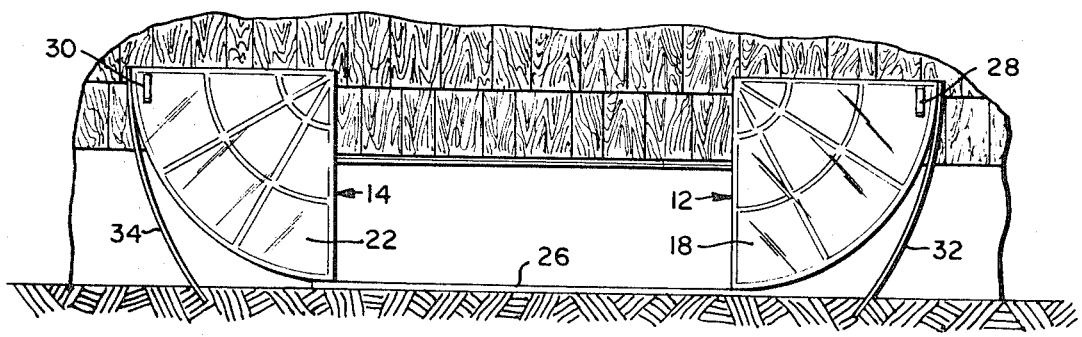
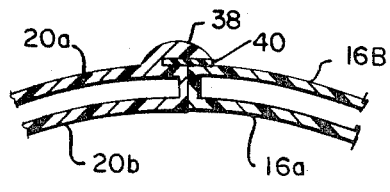
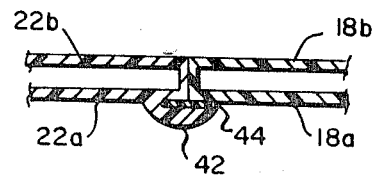
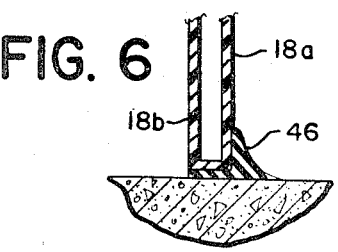
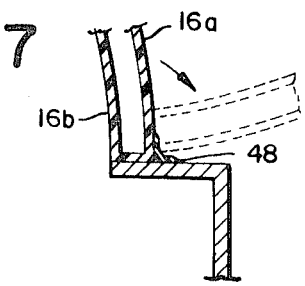
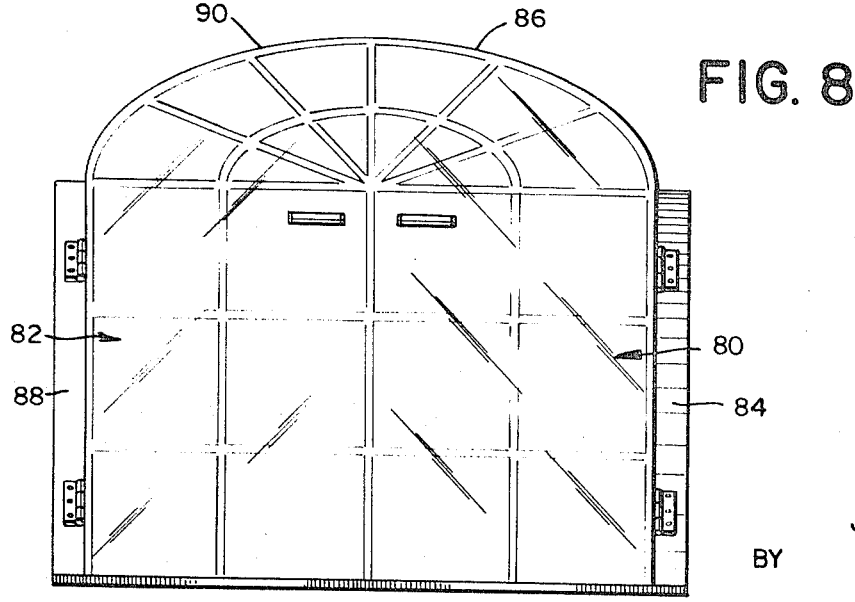
INVENTOR
JOSEPH R. BISSON
BY
FISHMAN & VAN KIRK
ATTORNEYS United States Patent Office 3,608,252
Patented Sept. 28, 1971

3,608,252
COMBINATION HATCHWAY-HOTHOUSE
Joseph R. Bisson, 3 Valley Crest Drive,
West Hartford, Conn. 06110
Filed Nov. 5, 1969, Ser. No. 874,243
Int. Cl. E02d 29/14; E04b 7/16
U.S. Cl. 52—19                                      8 Claims

ABSTRACT OF THE DISCLOSURE

Greenhouse structure of at least partially arcuate cross-sectional shape which opens to either side along the top center line. The structure is transparent, preferably comprised of molded plastic and may be substituted for building hatchway doors.

BACKGROUND OF THE INVENTION

(1) Field of the invention

The present invention relates to hothouse structure. More particularly, the present invention relates to greenhouse structure having a partly arcuate cross-sectional shape and opening along a top center line so as to provide access from the exterior. Accordingly, the general objects of the present invention are to provide novel and improved apparatus of such character.

(2) Description of the prior art

In recent years, a substantial demand has grown for relatively small size greenhouse structures for use in residential areas. Such structures, which permit year round gardening, are available. However, present greenhouse structure may be classified as either the free standing or lean-to types. In either case, the structure requires a separate foundation and, in most geographic areas, provision for heating must be made. The above requirements coupled with the standard aluminum frame glass pane construction, has placed prior art greenhouses out of the financial reach of most gardening enthusiasts.

SUMMARY OF THE INVENTION

The present invention overcomes the above-discussed and other disadvantages of the prior art by providing greenhouse structure which may be substituted for or installed in lieu of cellar hatchway doors. The structures of the present invention are at least partly of arcuate cross-sectional shape and are comprised of two doors which open to either side along the top center line of the structure. The structures are transparent or translucent and preferably comprised of a molded plastic material. In a preferred embodiment, each of the two doors which define the structure have inner and outer panels with an intermediate air space for insulation purposes. If necessary or desirable Plexiglas ribs may be employed for stiffening purposes and/or to provide spacing between the inner and outer panels of those embodiments which have the insulating air space. Suitable sealing material, preferably a compressible material, is provided along the two edges where the two doors of the structure meet and also along the points of contact between the doors and the hatchway frame.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 3 is a view, similar to FIG. 2, showing the doors in the fully opened position;

FIG. 4 is a view taken along line 4—4 of FIG. 1, depicting sealing provided between the doors in a preferred embodiment of the present invention;

FIG. 5 is a view, taken along line 5—5 of FIG. 1, further depicting the method of sealing the doors of the present invention when in the closed position;

FIG. 6 is a view, taken along line 6—6 of FIG. 1, which depicts the sealing of the forward ends of the doors of the present invention to the support structure;

FIG. 7 is a view, taken along 7—7 of FIG. 1, wihch depicts the sealing of the doors of the present invention to the sides of the support structure; and FIG. 8 is an end view of a second embodiment of the present invention.

DESCRIPTION OF THE PREFERRED EMBODIMENT

Figure 1:
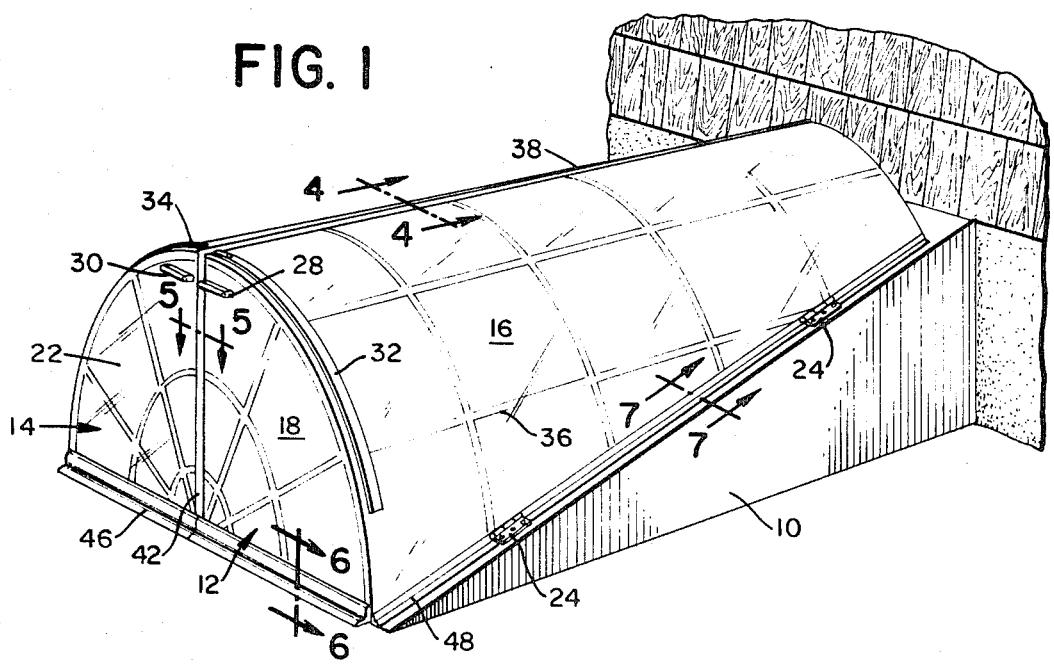
FIG. 1 is an isometric view of a preferred embodiment of the present invention shown in the installed position.

Referring now to FIG. 1, a preferred embodiment of the present invention is shown as installed, in lieu of conventional solid wooden or metal doors, on a hatchway which provides access to the basement of a building from the building exterior. As is convention, the hatchway is provided with oppositely disposed walls 10, only one of which is shown. Walls 10 will ordinarily be of metal or concrete construction and will extend both upwardly from the ground level as shown and also downwardly to the point where they meet the basement floor. A flight of stairs, not shown, will be positioned between walls 10 and will extend upwardly in graduated fashion from the building structure basement floor. In accordance with the present invention, during seasons when the hatchway would not ordinarily be used for access to the building, the stairs will be used as supporting racks for pots and trays in which plants are started and grown.

The greenhouse structures of the present invention comprises a pair of door members indicated generally at 12 and 14. As may be seen from the drawing, and particularly from FIG. 8, door members 12 and 14 define a structure which has a cross section which is at least partly arcuate, with each of the doors defining one half of the arc. As will be described in greater detail below, doors 12 and 14 will be formed from a moldable material which is transparent or sufficiently translucent so as to admit sufficient light to the interior of the structure for plant growing purposes. Each of doors 12 and 14 will have a top member and a front member. The respective top and front members of doors 12 and 14 are respectively indicated at 16 and 18 and 20 and 22. The doors 12 and 14 are supported from the hatchway frame by means of side members 16 and 20 which are attached to hatchway side walls 10 by hinges 24. In the closed position, front door members 18 and 22 rest on a door sill member 26 which forms part of the hatchway structure.

Figure 2:
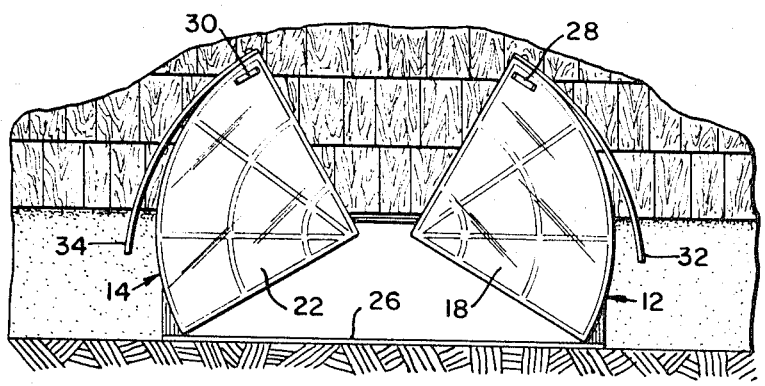
FIG. 2 is an end view, with the doors in the partially opened position, of the embodiment of FIG. 1.

Doors 12 and 14 are provided, on their respective front members 18 and 22, with handles 28 and 30 which may be used in order to open the doors in the manner shown in FIGS. 2 and 3. Doors 12 and 14 are also respectively provided with curved support rods 32 and 34 which are pivotally mounted to the doors adjacent the front of top members 16 and 20. As may be seen from FIGS. 2 and 3, when doors 12 and 14 are opened, the support rods 32 and 34 will swing outwardly and thus will provide support for the doors in the fully opened position as shown in FIG. 3. While only a pair of pivotable support rods 32 and 34 have been shown, depending upon the size and weight of doors 12 and 14, two or three rods may be provided on each of the doors.

As previously noted, doors 12 and 14 will be constructed of a transparent or translucent plastic material which may be molded into the desired shape. Depending upon the environmental conditions to be encountered, the members 16, 18, 20 and 22 may be formed of single pieces of a material such as Plexiglas. In the embodiment disclosed in FIGS. 1–7, it is contemplated that the greenhouse structure will be utilized in a locale where the winters are relatively severe. Accordingly, in order to impart added strength to the structure and also to provide insulation so that there will not be undue heat loss through the walls of the greenhouse, doors 12 and 14 will be comprised of two panels of plastic material with a trapped air space therebetween. Such insulated structure may be more clearly seen from FIGS. 4–7. In order to provide for spacing between the inner and outer panels of the door structure, each of the members 16, 18, 20 and 22 will be provided with stiffening ribs, such as ribs 36 of FIG. 1, which will be laminated between the inner panels 16b, 18b, 20b, and 22b and the outer panels 16a, 18a, 20a, and 22a. The ribs may also be seen from FIGS. 2, 3 and 8. Ribs 36 will typically be comprised of Plexiglass and the inner and outer panels of the door members will be secured to ribs 36 via a suitable adhesive. While ribs 36 could be comprised of metal or wood, use of Plexiglas is desirable in the interest of transmission of the maximum amount of sunlight through the structure.

The manner in which sealing of the various joints between doors 12 and 14 and between the doors and the hatchway base structure is achieved may be seen by consideration of FIGS. 4–7. From FIG. 4 it may be seen that top panel 16a of the door 12 is provided with an extension 38 which will overlap panel 20a of door 14. Extension 38 has a recess therein and a suitable weather stripping material 40 is positioned in said recess and against the lower surface of extension 38 whereby strip 40 will contact the upper surfaces of both of door panels 16a and 20a with the doors in the closed position as shown in FIG. 4. Weather stripping 40 will preferably be a compressible elastomer material and will effectively seal the joint between doors 12 and 14 when the doors are closed. As may be seen from FIG. 5, a similar sealing arrangement is provided for front door members 18 and 22 by means of an overlapping extension 42 on door panel 18a and a strip of sealing material 44. As may be seen from FIG. 6, sealing is achieved along the bottom of front door members 18 and 22 by means of a substantially L-shaped strip of compressible material 46 which tightly abuts both the front and bottom surfaces of the door members. Sealing strip 46 may also be seen from FIG. 1 and may either be attached to and thus move with the door panels or it may be affixed to the sill member 26. FIG. 7 depicts the means of sealing the edges of top door members 16 and 20 to the walls 10 of the hatchway. The sealing structure of FIG. 7 will comprise a strip of compressible material which extends the length of the doors. Choice of material for sealing strip 48 is dictated by the necessity that the material be able to withstand repeated flexings as doors 12 and 14 are opened and closed.

FIG. 8 depicts a second embodiment of the invention which, due to its shape, offers manufacturing economies. Thus, to obviate the necessity of a more complicated mold for the door panels, the doors 80 and 82 of the embodiment of FIG. 8 have respective side panels 86 and 90 which are characterized by portions which extend vertically from the hatchway walls 84 and 88. Through the use of side wall portions which extend vertically to the level of the top of the hatchway walls, the curved portions of the greenhouse walls may be uniformly shaped. While employing stiffening ribs, the embodiment of FIG. 8 does not have laminated door panels with a trapped air space although it could be so constructed.

In use, as noted above, plants and seedlings would typically be placed on the hatchway steps and growth thereof would be accelerated by sunlight entering through doors 12 and 14. In particularly cold weather, and especially at night, heat may be introduced into the greenhouse structure of the present invention by opening the cellar door at the bottom of the hatchway. At other times, sufficient heat will be generated by the sunlight which will heat the air trapped inside of the structure. The advantage of the arcuate shape of the present invention is that it allows tending of plants positioned on the hatchway steps while in an upright position. The style of the doors can be either traditional, as shown in the drawing, or contemporary or plain.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A greenhouse structure, such structure being designed for installation over a building hatchway, the structure comprising:

a pair of oppositely disposed doors, said doors defining an enclosure having at least a partly arcuate cross sectional shape, said doors having abutting front and top edges when in the closed position, said front and top edges being perpendicular to one another, said doors being comprised of a plastic material which transmits a substantial portion of the light incident thereto to the interior of the enclosure defined thereby;

hinge means for affixing each of said doors to a respective opposite side wall of a building hatchway whereby said doors may be opened outwardly with respect to their top edges; and weather stripping means for sealing said doors to one another and to the building hatchway when said doors are in the closed position.

2. The apparatus of claim 1 wherein said doors further comprise:

stiffening ribs.

3. The apparatus of claim 1 wherein the building hatchway has walls which extend above the ground level and which decrease in height progressing outwardly from the building foundation and wherein said doors each have front and side members, the side members of said doors being affixed to respective of said hatchway walls along one edge by said hinge means, said one edges of said doors being at the opposite side thereof from said top edges.

4. The apparatus of claim 3 wherein said door front members are integral with said side members and are in a plane perpendicular to the planes defined by said hatchway walls.

5. The apparatus of claim 4 wherein said door front and side members each comprise a pair of spacially displaced panels, said pairs of panels defining a trapped air space therebetween.

6. The apparatus of claim 4 further comprising:
  means for supporting said doors in the open position, said supporting means being pivotally attached to said doors and extending between the ground and the region of said top edge of each door, said supporting means lying flat on said doors side members with the doors in the closed position.

7. The apparatus of claim 5 wherein said doors each further comprise:
  stiffening ribs sandwiched between said pairs of panels.

8. The apparatus of claim 7 further comprising:
  means for supporting said doors in the open position, said supporting means being pivotally attached to said doors and extending between the ground and the region of said top edge of each door, said supporting means lying flat on said doors side members with the doors in the closed position.

References Cited

UNITED STATES PATENTS 3,103,996   9/1963   Wyatt _____ 49—367

JOHN E. MURTAGH, Primary Examiner

U.S. Cl. X.R.

52—66, 86